Sept. 15, 1925. 1,553,592
O. L. BORNER
APPARATUS FOR THE PRODUCTION OF HOLLOW
BLOCKS MADE FROM PLASTIC MATERIALS
Filed March 23, 1921 2 Sheets-Sheet 2
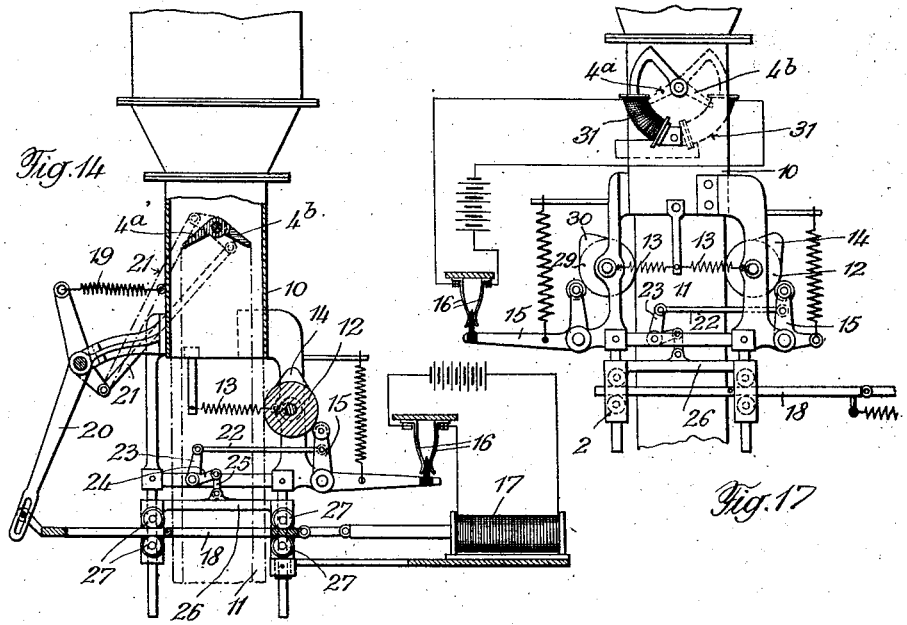
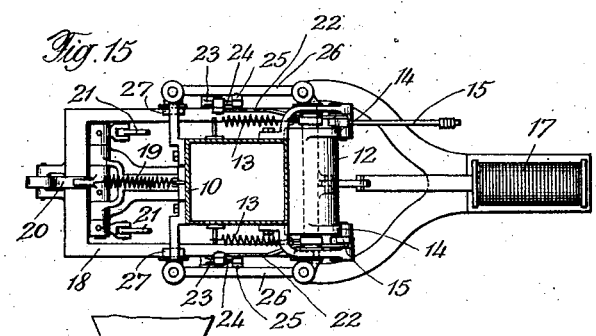
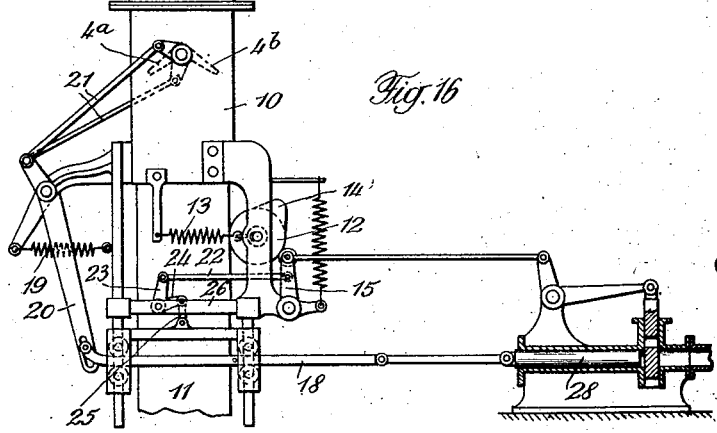

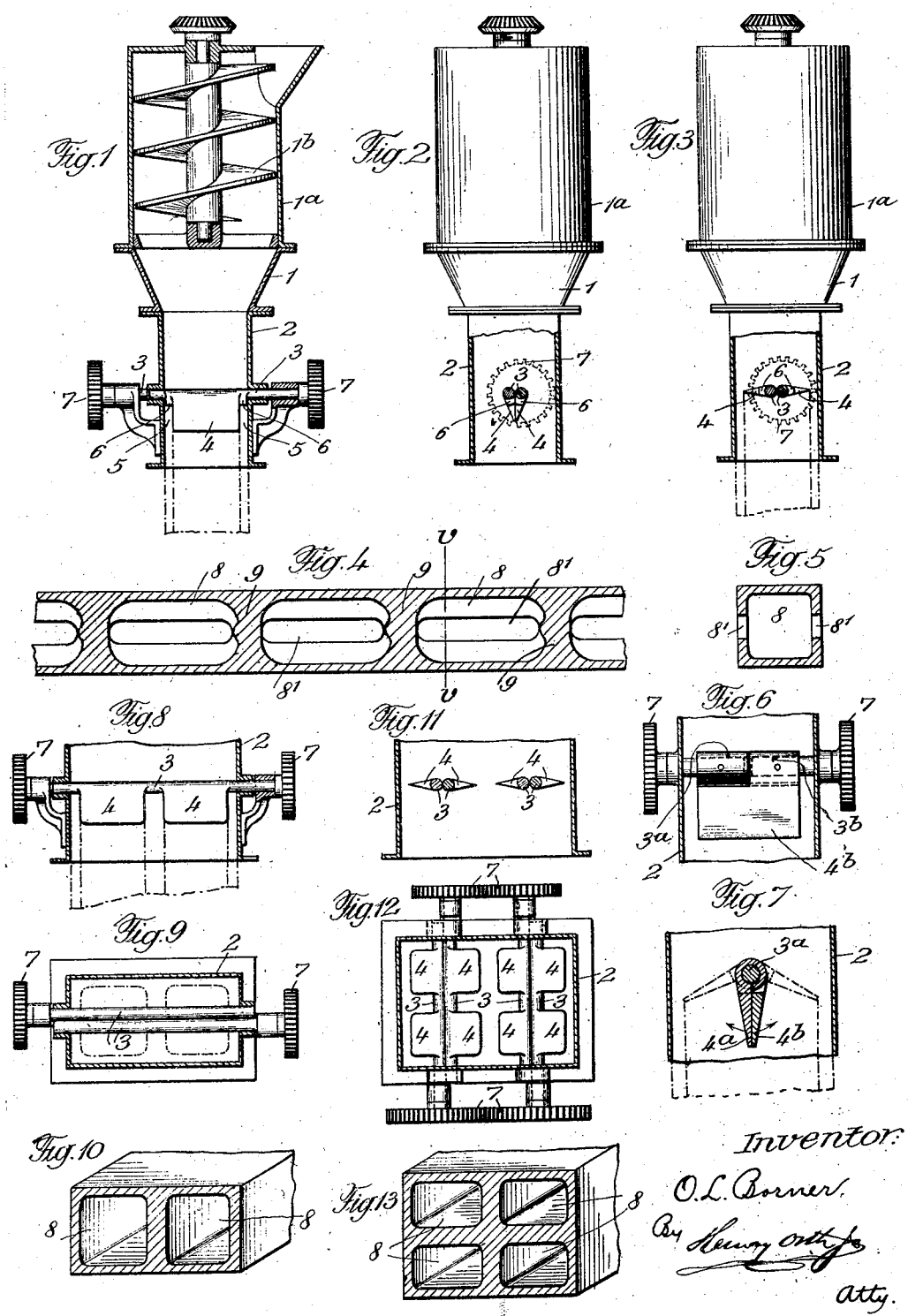

Patented Sept. 15, 1925.

1,553,592

UNITED STATES PATENT OFFICE.

OTTO L. BORNER, OF ZURICH, SWITZERLAND.

APPARATUS FOR THE PRODUCTION OF HOLLOW BLOCKS MADE FROM PLASTIC MATERIALS.

Application filed March 23, 1921. Serial No. 454,932.

*To all whom it may concern:*

Be it known that I, OTTO L. BORNER, a citizen of the Republic of Switzerland, residing at Zurich, Limmatquai 12, Switzerland, have invented certain new and useful Improvements in Apparatus for the Production of Hollow Blocks Made from Plastic Materials, for which I have made application for patents as follows, in Switzerland, 9th August, 1918, Patent No. 80,931; in Switzerland, 10 August, 1918, Patent No. 80,932; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

The present invention refers to apparatus for the production of hollow blocks or units made from plastic materials whereby the latter is pressed through a mould. According to the invention this mould, through which a continuous strip of the plastic material is pressed, which strip is cut into individual blocks or units, contains at least one pair of blades which are connected with organs by means of which the blades, which are set at right angles to the axis of the mould, are opened and closed alternately.

In the drawings several applications of the invention are shown.

Fig. 1 is a diagrammatical section of the apparatus.

Fig. 2 is a section of the apparatus at 90° to Fig. 1, partially also an elevation.

Fig. 3 is identical to Fig. 2 but with the blades opened.

Fig. 4 is a longitudinal section of the strip produced by the apparatus.

Fig. 5 is a cross-section through this strip following line V—V.

Fig. 6 is a section of a second type of apparatus.

Fig. 7 is a section of this apparatus at 90° to Fig. 6.

Fig. 8 is a vertical section through a third type of apparatus.

Fig. 9 is a horizontal section.

Fig. 10 is a cross-section through a strip produced by this type of apparatus.

Fig. 11 is a vertical section of a fourth type of apparatus.

Fig. 12 is a horizontal section of the same.

Fig. 13 is a cross-section through a strip produced by this type of apparatus.

Fig. 14 is a diagrammatical vertical section of a fifth type of apparatus.

Fig. 15 is a plan view of this apparatus.

Fig. 16 is a diagrammatical vertical section of a sixth type of apparatus.

Fig. 17 is a similar view of a seventh type of apparatus.

Number 1 (Figs. 1–3) represents a conical part the upper opening of which is connected with a cylinder $1^a$ in which a helical worm $1^b$ rotates. The lower opening is connected wnth the mould or mouthpiece 2 which is of rectangular shape. The mould 2 contains two parallel shafts 3 which can be turned at desired angles. On each of these shafts 3 is fixed a blade 4 the width of which in the direction of the shaft axis is smaller than the width of the mould 2. There results a space 5 between the ends of the blades 4 and the walls of the mould 2. The bosses of the blades 4 carry short extensions 6 in the direction of the shaft axis. On each shaft-end a cog-wheel 7 is fixed.

The apparatus thus described works as follows: The plastic mass is pressed towards the mould 2 by aid of the helical worm and issues through the lower opening after having passed the blades 4, 4 and the bosses 6, 6. If the blades are turned by the cog-wheels 7 into the position shown in Fig. 2 i. e. closed, and parallel to the axis of the mould 2, the plastic mass will pass over them and close itself again, so that the issuing strip shows a full section. If however the blades are opened as shown in Fig. 3, the issuing strip shows an opening 8. Provided the blades are operated at the right moment, the issuing strip will thus show spaces 8 and closed sections 9 alternately (Figs. 4 and 5). The spaces 8 are produced by the large portions of the blades 4 and the opening $8^1$ by the extended bosses 6. The filled in portions 9 are formed when the blades are closed. If the extended bosses are omitted, the openings corresponding to them will also disappear. Through the division of the issuing strip into pieces of equal length by known means, it may be arranged that these pieces contain a desired number of spaces, and furthermore the division can be arranged so that the cut-off pieces are closed at the ends also by simply cutting off through the middle of the filled in portions 9.

When manufacturing strips of large dimensions with two spaces beside each other, as shown in Fig. 10, it is necessary to place two sets of blades on a common axis, as shown in Figs. 8 and 9. In order to produce strips with four spaces beside each other, as shown in Fig. 13, it is necessary to place two pairs of blades on two parallel shafts. The strip may be divided as desired by cutting off correspondingly. On the other hand, if the strip should be of small dimensions, measured in the direction of the opening of the blades, it is necessary to place each pair of blades on one shaft as shown in Figs. 6 and 7. $3^a$ and $3^b$ are the ends of the two shafts which have a common axis and on these ends are mounted the blades $4^a$ and $4^b$. The bosses of these blades are only half as wide as the blades themselves, which when closed, cover each other over their whole length.

Strips produced by means such as enumerated, show in the direction of the movement of the strip, as is well known for various reasons, varying velocities which are to a large degree independent of the pressure in the mould and partly also of the speed of the worm. As a result it is impossible to cut the issuing strip into equal divisions by the aid of apparatus working with constant speed.

In order to overcome the difficulties referred to it is according to this invention arranged that part of the energy of the issuing strip is used to operate a controlling organ which puts additional forces into and out of action, which forces are used for the formation of the desired sections of the blocks or units and which are independent of the pressure in the mould and the speed of the helical worm.

In Fig. 14 the strip 11 issues through the mould 10. In this mould are placed two blades $4^a$ and $4^b$, which are in accordance with the desired section put into the required position. The issuing strip passes a roller 12 which serves as controlling organ. This roller 12 is pressed against the strip by means of two light springs 13 so that the roller is set into rotary motion by the issuing strip and a cam piece 14 and lever 15 are moved thereby. This lever 15 operates an electric contact 16 and opens and closes a current which is connected with a magnet 17. The magnet 17 operates a cutting apparatus 18 of known design, as soon as the contact is made by the lever 15, and the cutting apparatus returns to its original position by aid of a spring 19, as soon as the contact is broken. The cutting apparatus is connected with the blades $4^a$ and $4^b$ by means of a lever 20 and rods 21.

The cutting apparatus 18 has to move whilst the cut is made, with the same velocity as the strip, if the section of the cut is to be plane. In order to achieve this lever 15 is connected with a guide-lever 22 which operates levers 23 and 24. The latter moves by aid of a guide-lever 25 a guide 26 for the cutting apparatus 18 which is fitted with guiding rollers.

Instead of using electric forces the pressure of a gaseous or liquid medium may be used as shown in Fig. 16. 11 is the issuing strip, 12 the roller which serves as controlling organ. 14 is the cam piece and 15 the controlling lever; in this case operating a controlling gear for the gaseous or liquid medium which latter acts on a piston 28. The piston 28 is connected with the cutting apparatus 18.

The spring 19 is used to place the cutting apparatus in its original position. Instead of this spring 19 the piston 28 might be arranged double-acting or a second piston might be used instead of the spring.

The blades are moved in this case also by aid of rod and lever connected with the cutting apparatus.

In Fig. 17 an apparatus is shown which is used for the formation of more complicated sections of the strip and blocks. In this case two controlling organs 12, 14 and 29, 30 are used, one 12, 14 for working of the cutting apparatus and a second 29, 30 for working of the blades.

The additional power in this case is obtained electrically through the magnet 31.

What I claim now as my invention is:

1. A combination of apparatus for the production of hollow units from a continuous strip of plastic material, consisting of a mould, and means whereby the plastic material is pressed through this mould; at least one pair of blades placed in the mould at right angles to the axis of the mould, and means for operating these blades during the formation of the moving strip in such a manner, that they are opened out and closed alternately.

2. A combination of apparatus for the production of hollow units from a continuous strip of plastic material, consisting of a mould, means whereby the plastic material is pressed through this mould, at least one pair of blades placed in the mould at right angles to the axis of the mould, and having bosses, extended between the blades proper and the walls of the mould and means for operating these blades during the formation of the strip in such a manner that they are opened out and closed alternately.

3. A combination of apparatus for the production of hollow units from a continuous strip of plastic material, consisting of a mould, means whereby the plastic material is pressed through the mould, a controlling organ set in action by the aid of part of the energy contained in the issuing strip, means through which by the action of this controlling organ additional forces are put into and out of action, and further means whereby these forces actuate an apparatus for forming the desired longitudinal and cross sections of the strip.

4. A combination of apparatus for the production of hollow units from a continuous strip of plastic material consisting of a mould, means whereby the plastic material is pressed through the mould, at least one pair of blades placed in this mould, a controlling organ set in action by the aid of part of the energy contained in the issuing strip, means whereby this controlling organ puts additional forces into and out of action, and further means by the aid of which these forces operate the blades.

5. A combination of apparatus for the production of hollow units from a continuous strip of plastic material consisting of a mould, means whereby the plastic material is pressed through the mould, at least one pair of blades placed in this mould, a controlling organ set in action by the aid of part of the energy contained in the issuing strip, means whereby this controlling organ puts additional forces into and out of action, means through which by aid of these additional forces the issuing strip is divided into individual units.

6. A combination of apparatus for the production of hollow units from a continuous strip of plastic material consisting of a mould, means whereby the plastic material is pressed through the mould, at least one pair of blades placed in this mould, a controlling organ set in action by the aid of part of the energy contained in the issuing strip, means whereby this controlling organ puts additional forces into and out of action, means by which these forces operate the blades and means by the aid of which the issuing strip is divided into individual units.

7. A combination of apparatus for the production of hollow units from a continuous strip of plastic material, a mould, at least one pair of blades, means whereby the plastic material is pressed through the mould, a roller set in rotary motion by the moving strip and carrying a cam piece, a lever actuated by this cam piece, a magnet put into and out of action by the motion of this lever, and means whereby according to the action of the magnet the blades are actuated and the moving strip cut into individual sections.

In testimony that I claim the foregoing as my invention, I have signed my name.

O. L. BORNER.